United States Patent
Ichinose et al.

(10) Patent No.: US 7,582,338 B2
(45) Date of Patent: Sep. 1, 2009

(54) LIQUID CRYSTAL MEDIUM

(75) Inventors: Hideo Ichinose, Kanagawa Pref. (JP); Yuko Arai, Kanagawa Pref. (JP); Takanori Takeda, Kanagawa Pref. (JP); Tsuyoshi Okazaki, Nara (JP); Toshihiro Matsumoto, Nara (JP); Masahiro Shimizu, Kizugawa (JP); Takashi Katayama, Tenri (JP)

(73) Assignees: Merck Patent Gesellschaft mit beschrankter Haftung, Darmstadt (DE); Sharp Corporation, Osaka (JP)

( * ) Notice: Subject to any disclaimer, the term of this patent is extended or adjusted under 35 U.S.C. 154(b) by 0 days.

(21) Appl. No.: 12/100,769

(22) Filed: Apr. 10, 2008

(65) Prior Publication Data

US 2008/0251762 A1 Oct. 16, 2008

(30) Foreign Application Priority Data

Apr. 13, 2007 (EP) .................. 07007587

(51) Int. Cl.
*C09K 19/30* (2006.01)
*C09K 19/12* (2006.01)

(52) U.S. Cl. ............... 428/1.1; 252/299.63; 252/299.66

(58) Field of Classification Search .................. 428/1.1; 252/299.63, 299.66

See application file for complete search history.

(56) References Cited

U.S. PATENT DOCUMENTS

| | | | |
|---|---|---|---|
| 6,759,102 B2 * | 7/2004 | Murashiro et al. | 428/1.1 |
| 7,001,646 B2 * | 2/2006 | Heckmeier et al. | 428/1.1 |
| 7,288,295 B2 * | 10/2007 | Ichinose et al. | 428/1.1 |
| 7,390,538 B2 * | 6/2008 | Manabe et al. | 428/1.1 |
| 7,419,705 B2 * | 9/2008 | Heckmeier et al. | 428/1.1 |
| 7,445,819 B2 * | 11/2008 | Czanta et al. | 428/1.1 |
| 7,482,044 B2 * | 1/2009 | Czanta et al. | 428/1.3 |
| 2006/0115605 A1 * | 6/2006 | Ichinose et al. | 428/1.1 |
| 2006/0278850 A1 * | 12/2006 | Czanta et al. | 252/299.61 |
| 2007/0001149 A1 * | 1/2007 | Manabe et al. | 252/299.66 |
| 2007/0034830 A1 * | 2/2007 | Heckmeier et al. | 252/299.63 |
| 2007/0205396 A1 * | 9/2007 | Czanta et al. | 252/299.61 |
| 2007/0235688 A1 * | 10/2007 | Czanta et al. | 252/299.61 |

* cited by examiner

*Primary Examiner*—Shean C Wu
(74) *Attorney, Agent, or Firm*—Millen, White, Zelano & Branigan, P.C.

(57) ABSTRACT

Discloses are liquid crystal medium based on a mixture of polar compounds, the use thereof for electro-optical purposes, and displays containing the medium.

19 Claims, No Drawings

LIQUID CRYSTAL MEDIUM

The present invention relates to liquid crystalline media and to liquid crystal displays comprising these media, especially to displays addressed by an active matrix and in particular to displays of the optically compensated bend (OCB) mode.

There is a great demand for liquid crystal displays (LCDs), in particular of the matrix type, that have very high specific resistance at the same time as a large working-temperature range, short response times even at low temperatures and low threshold voltage. In particular, LC media for twisted nematic (TN) display cells are required which facilitate the following advantages in the cells:

- extended nematic phase range (in particular down to low temperatures)
- the ability to switch at extremely low temperatures (outdoor use, auto-mobile, avionics)
- increased resistance to UV radiation (longer service life).

For TV and monitor applications, LC media are desired which have a fast response time and a low threshold voltage, furthermore a good low temperature stability (LTS). Also, depending on the thickness of the switchable LC layer, a moderate or rather high birefringence may be required.

Especially the OCB mode is used for LCDs for application in TVs and is envisaged to be applied for displays for automotive and other mobile applications. The liquid crystals according to the present invention are preferably used in these types of displays.

For these displays new liquid crystalline media with improved properties are required. Especially the response times have to be improved for many types of applications. Thus, liquid crystalline media with lower viscosities ($\eta$), especially with lower rotational viscosities ($\gamma_1$) are required. The rotational viscosity should be 160 mPa·s or less, preferably 155 mPa·s or less and especially 145 mPa·s or less for media with clearing point of 100° C. or more, preferably of 110° C. or more. Besides this parameter, the media have to exhibit a suitably wide range of the nematic phase, an appropriate birefringence ($\Delta n$) and their dielectric anisotropy ($\Delta\epsilon$) should be high enough, to allow a reasonably low operation voltage. Preferably $\Delta\epsilon$ should be higher than 8 and very preferably higher than 8.5, preferably, however, not higher than 10 and in particular not higher than 9, as this would be detrimental for an at least reasonably high specific resistivity.

The displays according to the present invention are preferably addressed by an active matrix (active matrix LCDs: AMDs), preferably by a matrix of thin film transistors (TFTs). However, the inventive liquid crystals can also beneficially be used in displays with other known addressing means.

Liquid crystal compositions use for LCDs and in particular for OCB displays are known e.g. from JP 2001-72977 (A) and JP 2003-327964 (A). These compositions, however, do have significant drawbacks with respect to their physical properties. Most of them, amongst other deficiencies, lead to unfavourable LCD performances like e.g. long response times, have too low values of the resistivity and/or a narrow operating temperature range.

Thus, there is a significant need for liquid crystalline media with suitable properties for practical applications such as a wide nematic phase range, appropriately high temperature for the nematic-isotoropic phase change (clearing point), a high optical anisotropy $\Delta n$, according to the display mode used, a relatively high $\Delta\epsilon$ and especially low viscosities.

The present invention has the aim of providing LC media, in particular for active matrix displays like those of the TFT type, and in particular for OCB displays, which do not have the above-mentioned disadvantages or only do so to a reduced extent, and preferably simultaneously have a very high specific resistance, a low threshold voltages, a low rotational viscosity, a broad nematic phase range with high clearing point, an improved LTS and fast switching times. Another aim is to extend the pool of LC media available to the expert. Other aims are immediately evident from the following description.

Surprisingly, it now has been found that liquid crystalline media with a suitably high $\Delta\epsilon$, a suitable phase range, and $\Delta n$ can be realized, which do not exhibit the drawbacks of the materials of the prior art or at least do exhibit them to a significantly lesser degree and are well suited for application in OCB displays.

The present invention thus relates to a LC medium comprising 14 to 20% of two or three compounds of formula I,
optionally 0 to 5% of one compound of formula II,
15 to 19% of one or two compounds of formula III,
20 to 23% of two compounds of formula IV,
optionally 0 to 7% of one compound of formula V,
11 to 18% of one or two compounds of formula VI,
5 to 7% of one compound of formula VII,
optionally 0 to 5% of one compound of formula VIII and
15 to 20% of two or three compounds of formula IX,

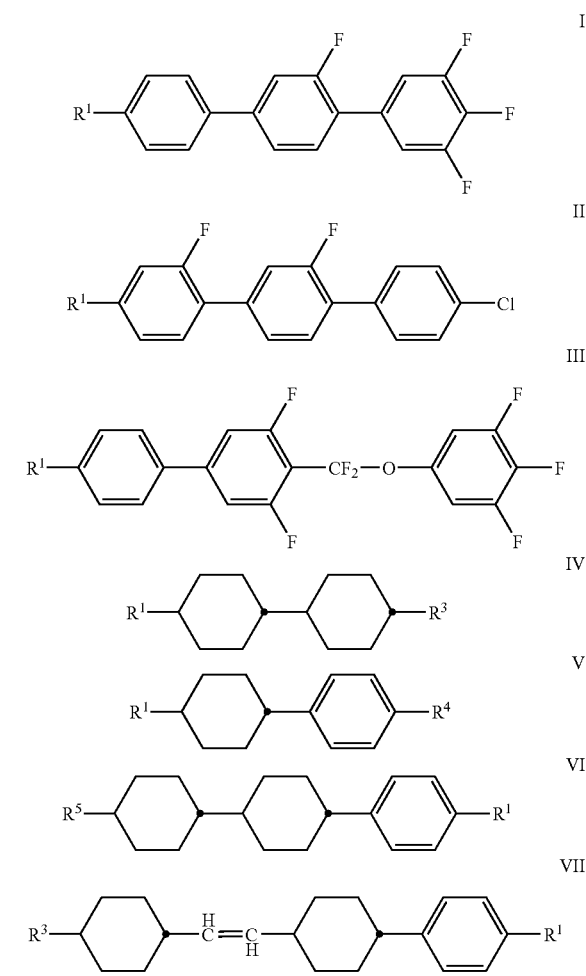

VIII

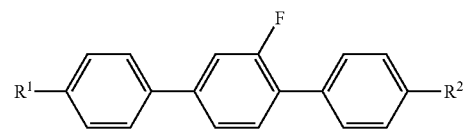

IX

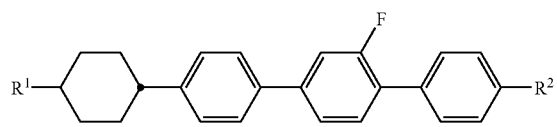

wherein
R¹ and R² are independently of each other straight-chain alkyl with 1 to 5 C atoms, preferably methyl, ethyl, n-propyl, n-butyl or n-pentyl,
R³ is straight-chain alkenyl with 2 to 4 C atoms, preferably vinyl or 1E-propenyl,
R⁴ is alkoxy with 1 or 2 C atoms, preferably methoxy,
R⁵ is straight-chain alkenyl with 2 to 4 C atoms, preferably vinyl or 3-butenyl.

Especially preferred is a LC medium comprising one or more compounds selected from the following formulae Ia

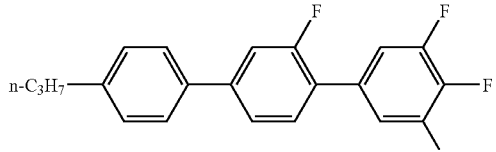

Ib

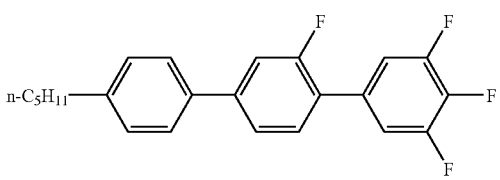

Ic

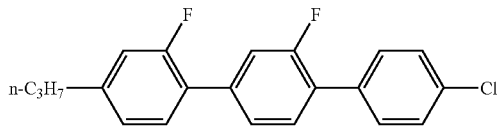

IIa

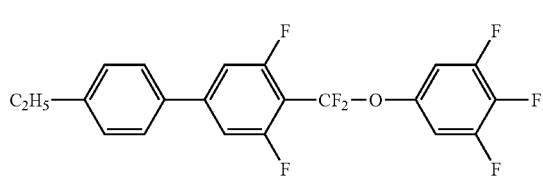

IIIa

In a first preferred embodiment of the present invention the LC medium comprises
- 15 to 16% of two compounds of formula I, preferably of formulae Ia and Ib,
- 2 to 4% of one compound of formula II, preferably of formula IIa,
- 17 to 19% of two compounds of formula II, preferably of formulae IIIa and IIIb, 21 to 23% of two compounds of formula IV, preferably of formulae IVa and IVb, 15 to 17% of two compounds of formula VI, preferably of formulae VIa and VIb, 5 to 7% of one compound of formula VII, preferably of formula VIIa, and 18 to 20% of three compounds of formula IX, preferably of formulae IXa, IXb and IXc.

In a second preferred embodiment of the present invention the LC medium comprises 18 to 20% of three compounds of formula I, preferably of formulae Ia and Ib, 15 to 17% of one compound of formula II, preferably of formulae IIIb, 20 to 22% of two compounds of formula IV, preferably of formulae IVa and IVb, 4 to 6% of one compounds of formula V, preferably of formula Va, 16 to 18% of two compounds of formula VI, preferably of formulae VIa and VIb, 5 to 7% of one compound of formula VII, preferably of formula VIIa, and 15 to 17% of two compounds of formula IX, preferably of formulae IXb and IXc.

The LC media according to the present invention are advantageous because they have a broad nematic phase with a high clearing point, a low viscosity, a moderately high birefringence and a low threshold voltage.

In the pure state, the compounds of the formulae I-IX are colourless and, in combination with each other, form liquid crystalline meso-phases in a temperature range, which is favourably located for use in electro-optical devices. They are stable chemically, thermally and to light.

The compounds of the formulae I-IX are prepared by methods known per se, as described in the literature (for example in the standard works, such as Houben-Weyl, "Methoden der organischen Chemie" [Methods of Organic Chemistry], Georg-Thieme-Verlag, Stuttgart), to be precise under reaction conditions which are known and suitable for the said reactions. Use can also be made here of variants which are known per se, but are not mentioned here in greater detail.

The invention also relates to electro-optical displays, which comprise LC media of this type, and to the use of these LC media for electro-optical purposes. Very preferred are TFT displays having two plane-parallel outer plates, which, together with a frame, form a cell, integrated non-linear elements for switching individual pixels on the outer plates, and a nematic LC medium according to the present invention having positive dielectric anisotropy and a high specific resistance which is located in the cell.

The LC mixtures according to the invention enable a significant widening of the available parameter latitude. Especially, it was found that they have a fast switching time, low threshold voltage, good LTS, high specific resistance, high UV stability and high capacity holding ratio (HR) [as defined in S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)]. Also, the achievable combinations of clearing point, rotational viscosity $\gamma_1$, moderately high $\Delta n$ and relatively high dielectric anisotropy are superior to materials known from prior art.

The construction of an LC display according to the present invention, including polarisers, electrode base plates and surface-treated electrodes corresponds to the conventional construction for displays of this type. The term "conventional construction" here covers all derivatives and modifications of the LC display, in particular including matrix display elements based on poly-Si TFT or MIM (metal-insulator-metal). A significant difference between the displays according to the invention and the conventional displays based on the TN cell consists, however, in the choice of the parameters of the LC layer.

The LC mixtures which can be used in accordance, with the present invention, are prepared in a manner conventional per se. In general, the desired amount of the components used in the lesser amount is dissolved in the components making up the principal constituent, advantageously at elevated temperature.

The LC media may also comprise further additives known to the person skilled in the art and described in the literature. For example, optionally 0 to 15% of pleochroic dyes, stabilizers and/or chiral dopants can be added. Suitable dopants and stabilizers are shown below.

In the present application and in the examples below, the structures of the components of the LC media are indicated by the following acronyms:

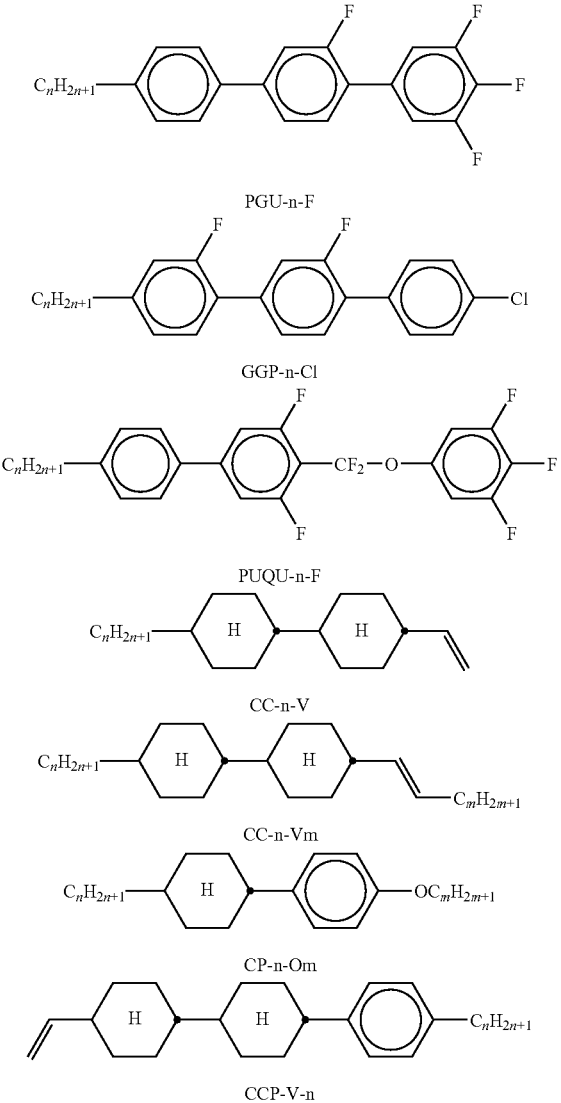

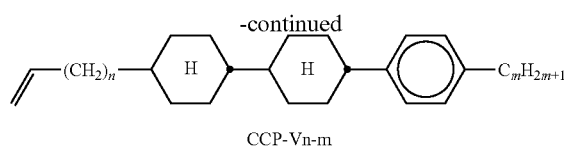
CCP-Vn-m
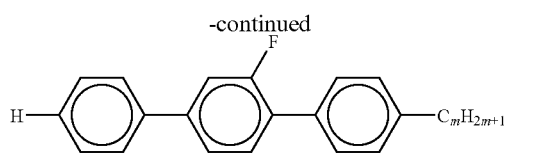
PGP-n-m
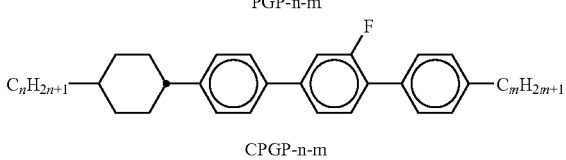
CPGP-n-m
The following list shows possible chiral dopants that can be added to the LC media according to the present invention, preferably in proportions of from 0.1 to 10 wt.-%, very preferably from 0.1 to 6 wt.-%:
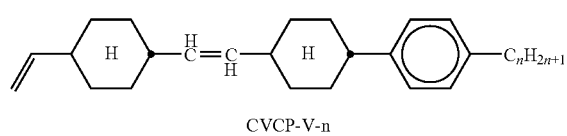
CVCP-V-n
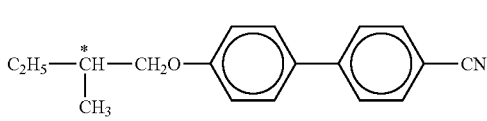
C 15
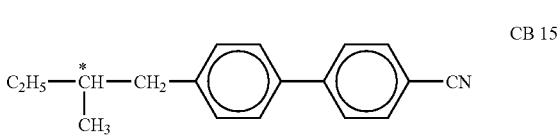
CB 15
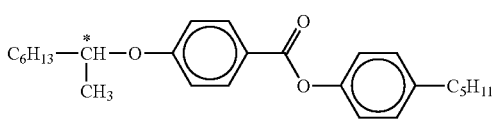
CM 21
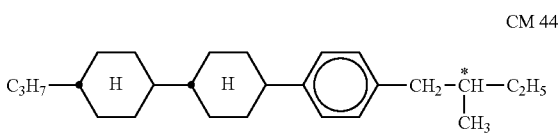
CM 44
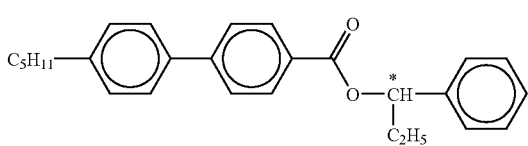
CM 45
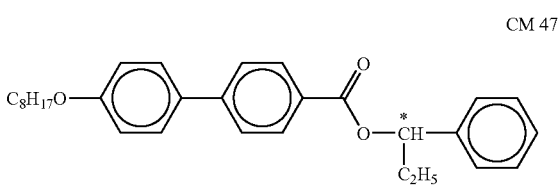
CM 47
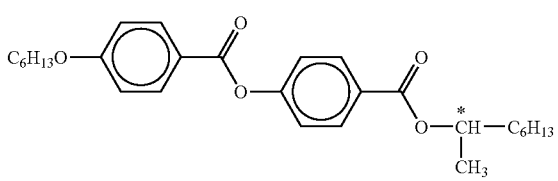
R/S-811
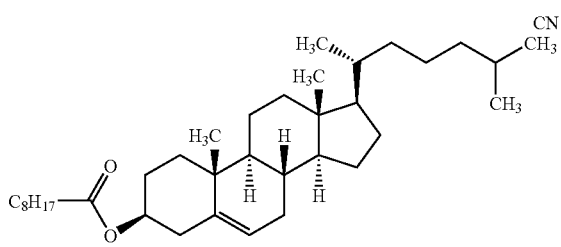
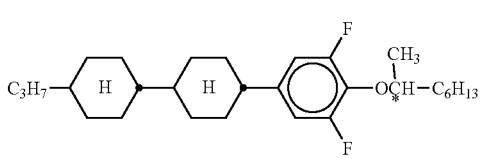
R/S-2011
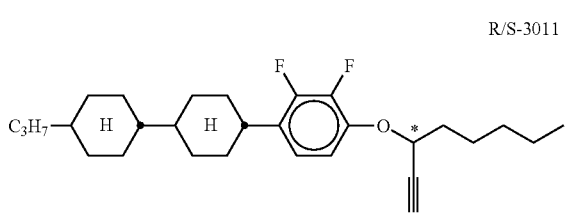
R/S-3011

-continued
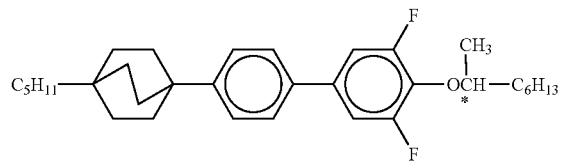
R/S-4011
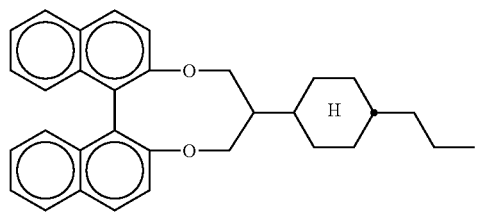
R/S-5011
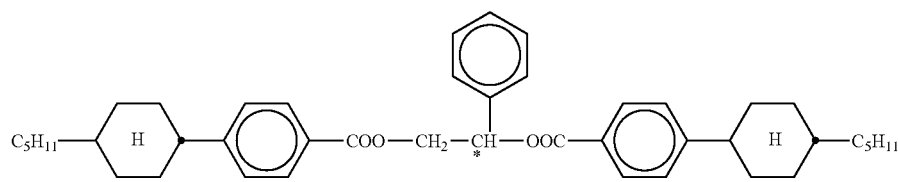
R/S-1011
The following list shows possible stabilizers that can be added to the LC media according to the present invention:
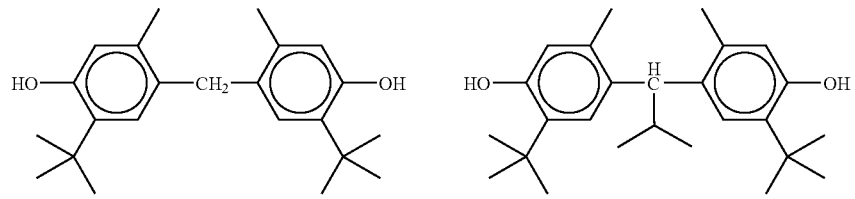
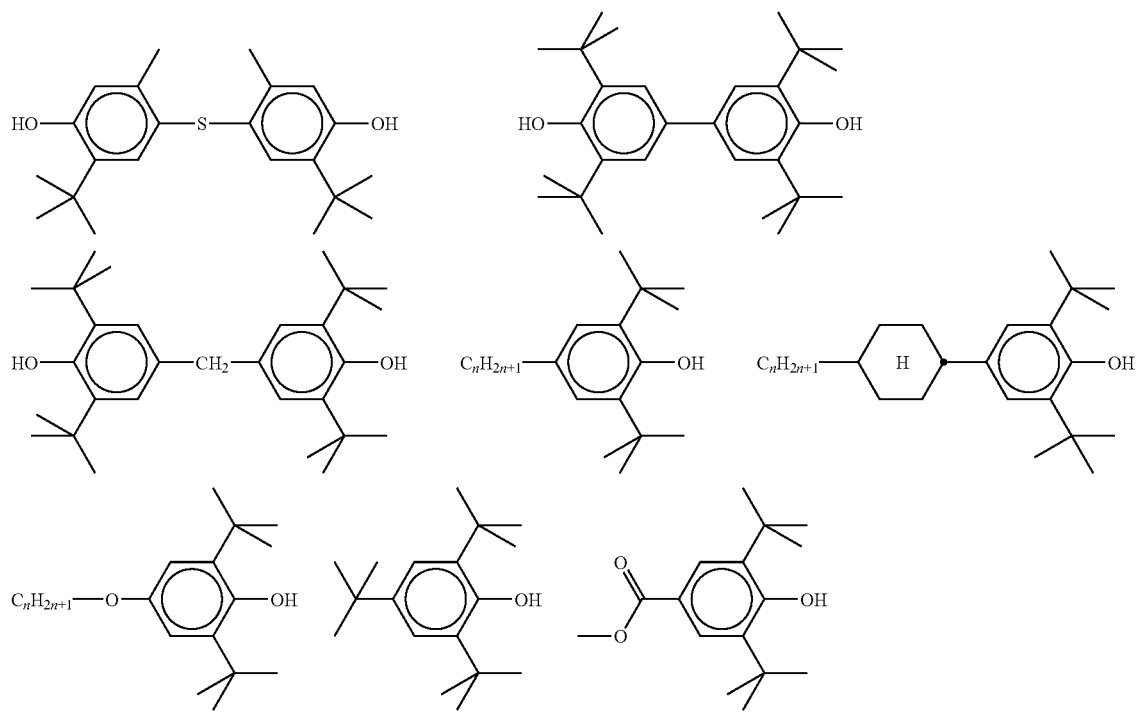

-continued
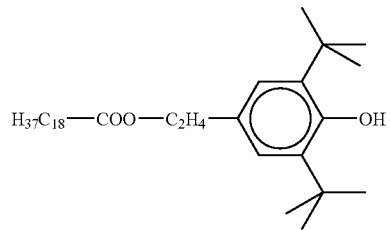
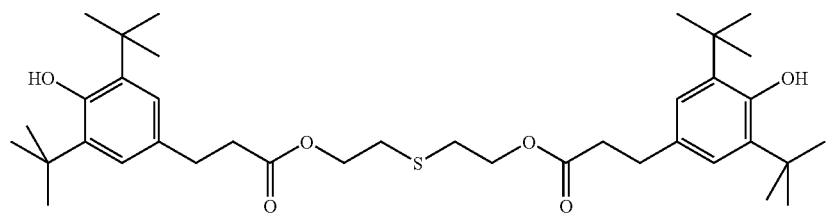
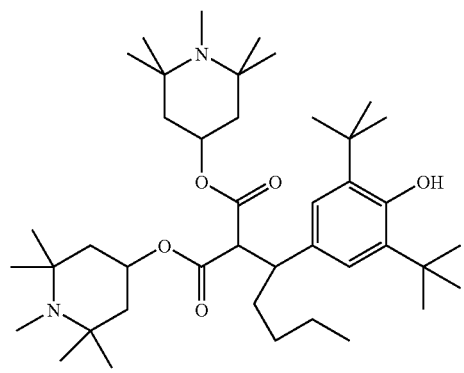
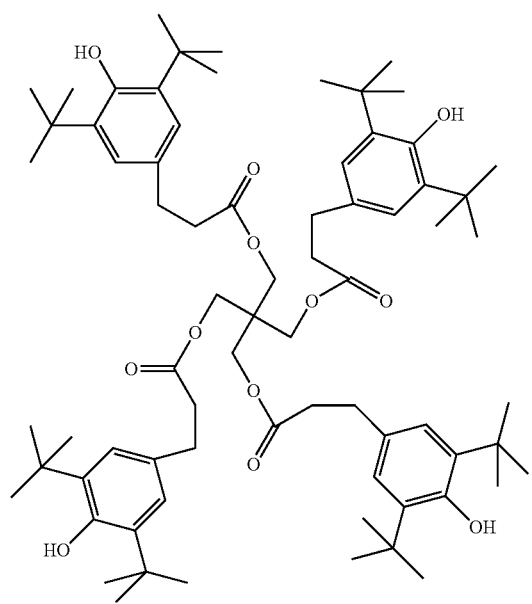
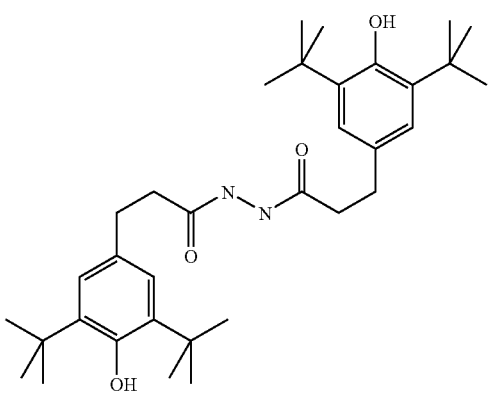

-continued
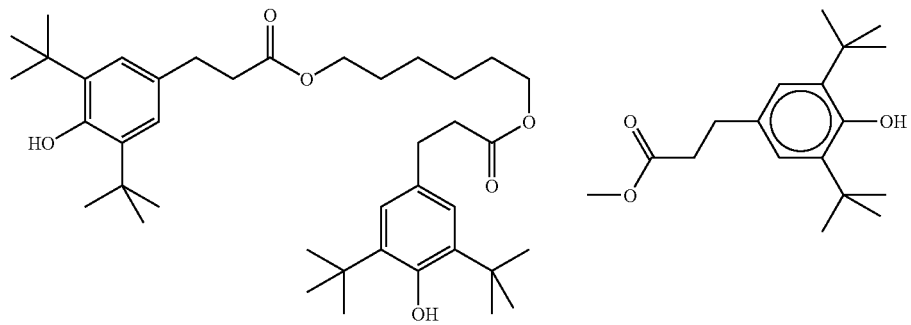
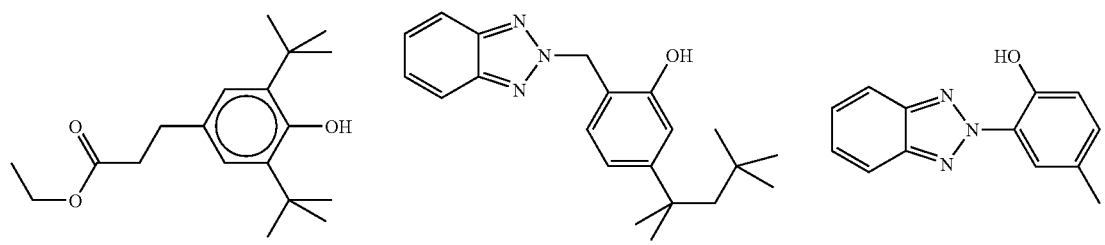
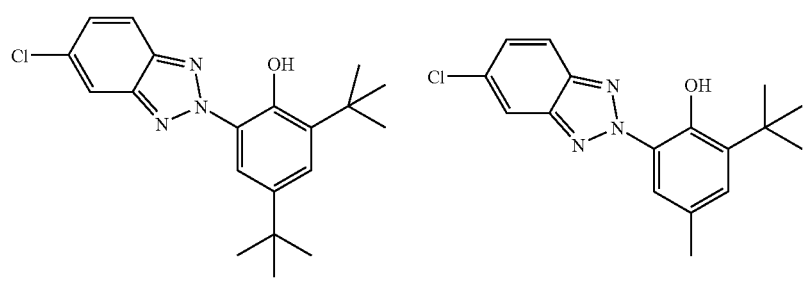
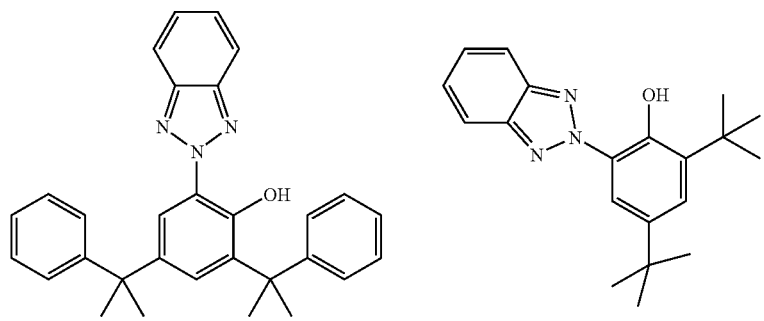
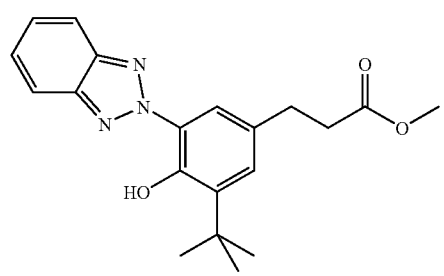

-continued
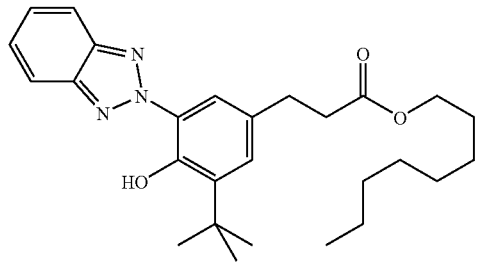
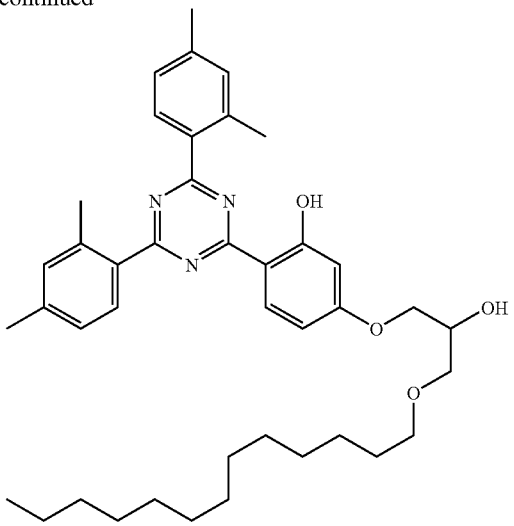
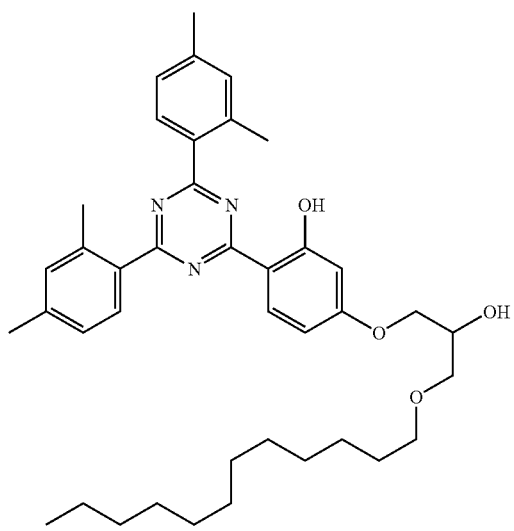
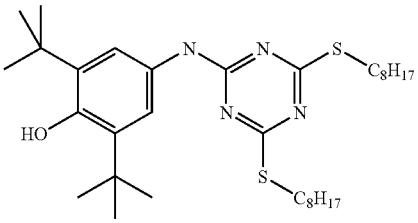
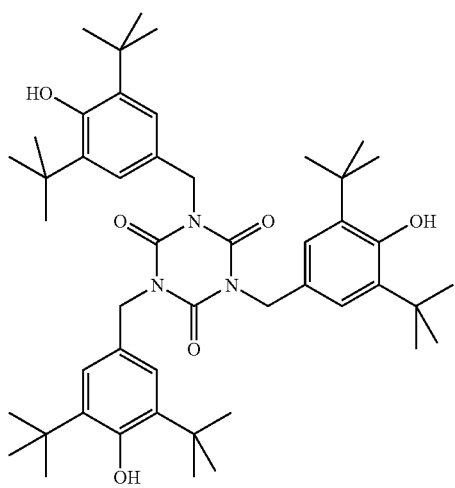
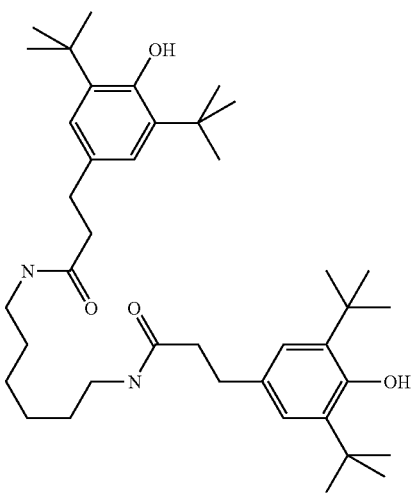

-continued

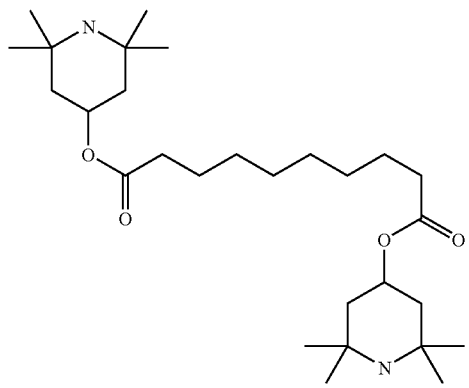 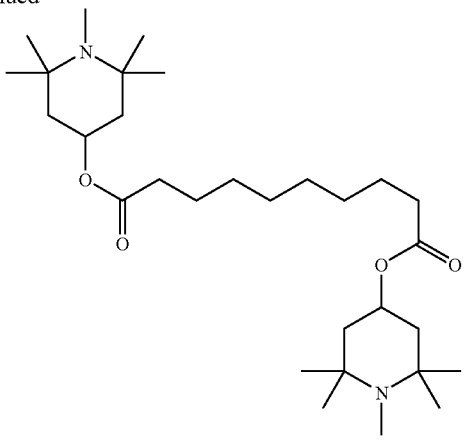

Above and below, percentages are percent by weight. All temperatures are given in degrees Celsius. m.p. denotes melting point, cl.p.=clearing point. Furthermore, C=crystalline state, N=nematic phase, S=smectic phase and I=isotropic phase. The data between these symbols represent the transition temperatures. Δn denotes the optical anisotropy and $n_e$ the extraordinary refractive index (589 nm, 20° C.). The rotational viscosity $\gamma_1$ [mPa·s] is determined at 20° C. $V_{10}$ denotes the voltage for 10% relative transmission (viewing angle perpendicular to the plate surface), whereas $V_{90}$ denotes the voltage for 90% relative transmission. $\Delta\epsilon$ denotes the dielectric anisotropy ($\Delta\epsilon=\epsilon_\|-\epsilon_\perp$, where $\epsilon_\|$ denotes the dielectric constant parallel to the longitudinal molecular axes and $\epsilon_\perp$ denotes the dielectric constant perpendicular thereto). The electro-optical data are measured in a TN cell at the 1$^{st}$ minimum (i.e. at a d·Δn value of 0.5 μm) at 20° C., unless expressly stated otherwise. The optical data are measured at 20° C., unless expressly stated otherwise.

The following examples should explain the invention without restricting it.

EXAMPLE 1

| | Composition Compound | |
|---|---|---|
| No. | Abbreviation | Conc./% |
| 1 | PGU-2-F | 7.00 |
| 2 | PGU-3-F | 8.00 |
| 3 | GGP-3-CL | 3.00 |
| 4 | PUQU-2-F | 5.00 |
| 5 | PUQU-3-F | 13.00 |
| 6 | CC-3-V1 | 8.00 |
| 7 | CC-4-V | 14.00 |
| 8 | CCP-V-1 | 11.00 |
| 9 | CCP-V2-1 | 6.00 |
| 10 | CVCP-V-1 | 6.00 |
| 11 | CPGP-4-3 | 3.00 |
| 12 | CPGP-5-2 | 8.00 |
| 13 | CPGP-5-3 | 8.00 |
| Σ | | 100.00 |
| Physical Properties | | |
| T (N, I) = | | 114.9° C. |
| $n_e$ (20° C., 589.3 nm) = | | 1.6495 |

-continued

| | |
|---|---|
| Δn (20° C., 589.3 nm) = | 0.1505 |
| $\epsilon_\|$ (20° C., 1 kHz) = | 12.1 |
| Δϵ (20° C., 1 kHz) = | 8.7 |
| $\gamma_1$ (20° C.) = | 154 mPa·s |
| $V_{10}$ (20° C.) = | 1.73 V |
| $(1 - V_{90}/V_{10})$(20° C.) = | 46.8% |

This mixture is very well suited for displays operating in the OCB mode.

EXAMPLE 2

A liquid crystal mixture is realized with the composition and properties given in the following table.

| | Composition Compound | |
|---|---|---|
| No. | Abbreviation | Conc./% |
| 1 | PGU-2-F | 8.00 |
| 2 | PGU-3-F | 8.00 |
| 3 | PGU-5-F | 3.00 |
| 4 | PUQU-3-F | 16.00 |
| 5 | CC-3-V1 | 9.00 |
| 6 | CC-4-V | 12.00 |
| 7 | CP-3-O1 | 5.00 |
| 8 | CCP-V-1 | 12.00 |
| 9 | CVCP-V-1 | 6.00 |
| 10 | PGP-2-3 | 5.00 |
| 11 | CPGP-5-2 | 8.00 |
| 12 | CPGP-5-3 | 8.00 |
| Σ | | 100.00 |
| Physical Properties | | |
| T (N, I) = | | 101.8° C. |
| $n_e$ (20° C., 589.3 nm) = | | 1.6517 |
| Δn (20° C., 589.3 nm) = | | 0.1515 |
| $\epsilon_\|$ (20° C., 1 kHz) = | | 11.9 |
| Δϵ (20° C., 1 kHz) = | | 8.4 |
| $\gamma_1$ (20° C.) = | | 142 mPa·s |
| $V_{10}$ (20° C.) = | | 1.64 V |
| $(1 - V_{90}/V_{10})$(20° C.) = | | 47.0% |

This mixture is very well suited for displays operating in the OCB mode.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application No. 07007587.4, filed Apr. 13, 2007 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A liquid crystal medium comprising
14 to 20% of two or three compounds of formula I,
0 to 5% of one compound of formula II,
15 to 19% of one or two compounds of formula III,
20 to 23% of two compounds of formula IV,
0 to 7% of one compound of formula V,
11 to 18% of one or two compounds of formula VI,
5 to 7% of one compound of formula VII,
0 to 5% of one compound of formula VIII, and
15 to 20% of two or three compounds of formula IX,

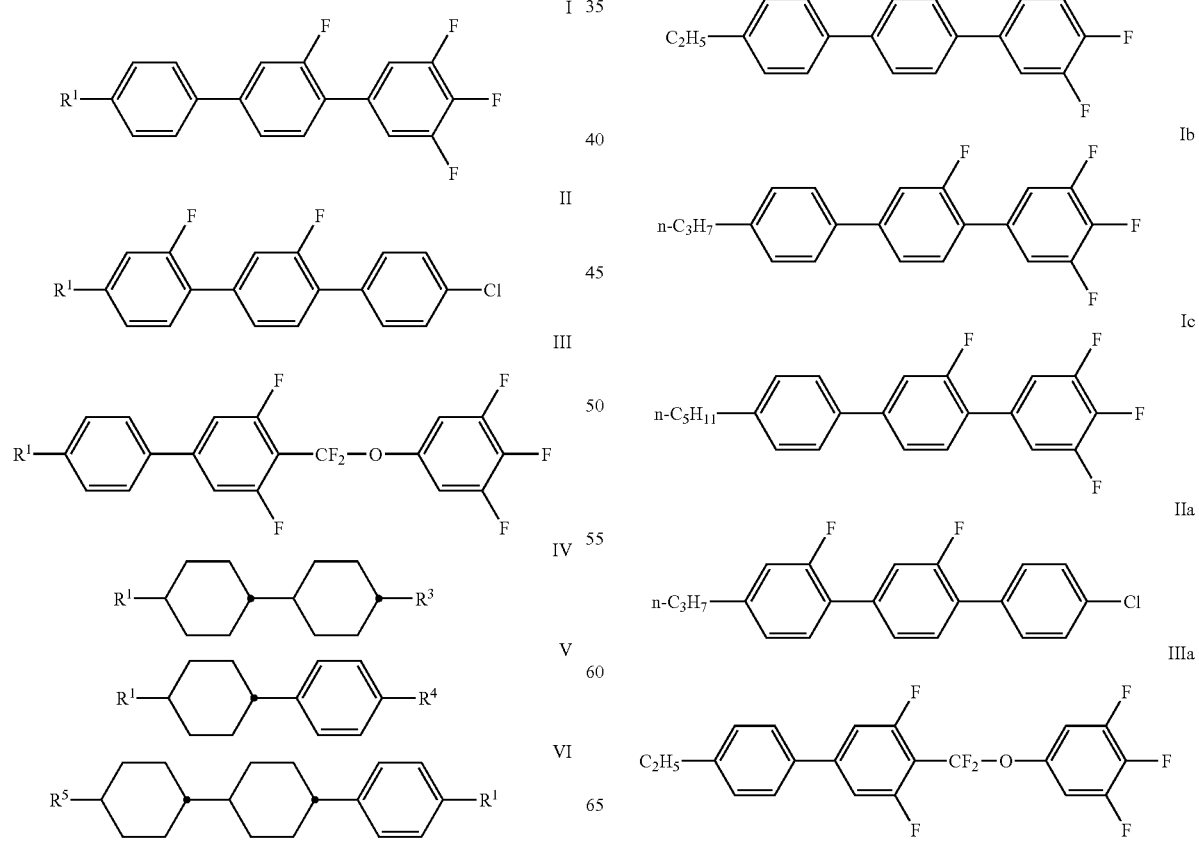

wherein
$R^1$ and $R^2$ are, independently of each other, straight-chain alkyl with 1 to 5 C atoms,
$R^3$ is straight-chain alkenyl with 2 to 4 C atoms,
$R^4$ is alkoxy with 1 or 2 C atoms,
$R^5$ is straight-chain alkenyl with 2 to 4 C atoms.

2. A liquid crystal medium according to claim 1, which comprises one or more of the following compounds

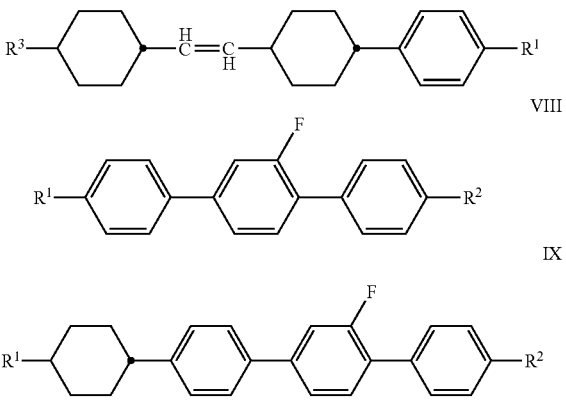

-continued

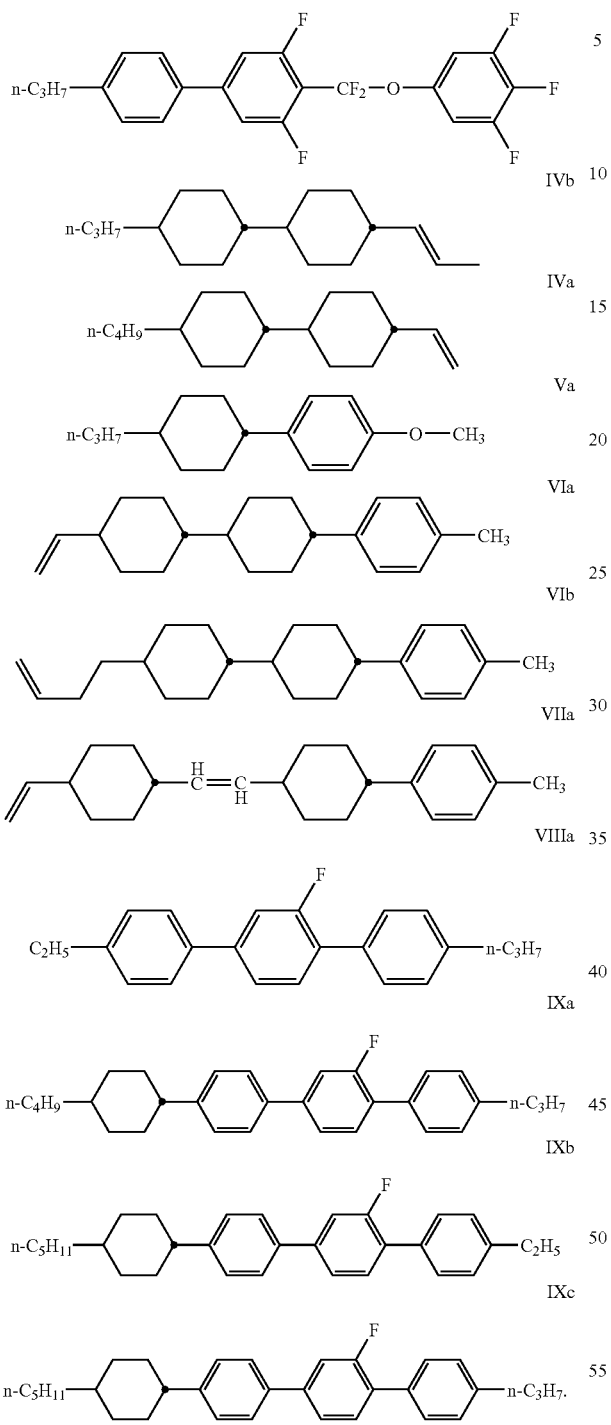

3. A liquid crystal medium according to claim 1, which comprises
    15 to 16% of two compounds of formula I,
    2 to 4% of one compound of formula II,
    17 to 19% of two compounds of formula III,
    21 to 23% of two compounds of formula IV,
    15 to 17% of two compounds of formula VI,
    5 to 7% of one compound of formula VII, and
    18 to 20% of three compounds of formula IX.

4. A liquid crystal medium according to claim 1, which comprises
    18 to 20% of three compounds of formula I,
    15 to 17% of one compound of formula III,
    20 to 22% of two compounds of formula IV,
    4 to 6% of one compounds of formula V,
    16 to 18% of two compounds of formula VI,
    5 to 7% of one compound of formula VII, and
    15 to 17% of two compounds of formula IX.

5. An electro-optical device, containing a liquid crystal medium according to claim 1.

6. An electro-optical liquid crystal display, containing a liquid crystal medium according to claims 1.

7. A Liquid crystal medium according to claim 1, wherein
    $R^1$ and $R^2$ are, independently of each other, methyl, ethyl, n-propyl, n-butyl or n-pentyl,
    $R^3$ is vinyl or 1E-propenyl,
    $R^4$ is methoxy, and
    $R^5$ is vinyl or 3-butenyl.

8. A Liquid crystal medium according to claim 1, wherein
    $R^1$ and $R^2$ are, independently of each other, methyl, ethyl, n-propyl, n-butyl or n-pentyl.

9. A Liquid crystal medium according to claim 1, wherein $R^3$ is vinyl or 1E-propenyl.

10. A Liquid crystal medium according to claim 1, wherein $R^4$ is methoxy.

11. A Liquid crystal medium according to claim 1, wherein $R^5$ is vinyl or 3-butenyl.

12. A liquid crystal medium according to claim 2, which comprises
    15 to 16% of two compounds of formula I,
    2 to 4% of one compound of formula II,
    17 to 19% of two compounds of formula III,
    21 to 23% of two compounds of formula IV,
    15 to 17% of two compounds of formula VI,
    5 to 7% of one compound of formula VII, and
    18 to 20% of three compounds of formula IX.

13. A liquid crystal medium according to claim 2, which comprises
    18 to 20% of three compounds of formula I,
    15 to 17% of one compound of formula III,
    20 to 22% of two compounds of formula IV,
    4 to 6% of one compounds of formula V,
    16 to 18% of two compounds of formula VI,
    5 to 7% of one compound of formula VII, and
    15 to 17% of two compounds of formula IX.

14. A liquid crystal medium according to claim 7, which comprises
    15 to 16% of two compounds of formula I,
    2 to 4% of one compound of formula II,
    17 to 19% of two compounds of formula III,
    21 to 23% of two compounds of formula IV,
    15 to 17% of two compounds of formula VI,
    5 to 7% of one compound of formula VII, and
    18 to 20% of three compounds of formula IX.

15. A liquid crystal medium according to claim 7, which comprises
    18 to 20% of three compounds of formula I,
    15 to 17% of one compound of formula III,
    20 to 22% of two compounds of formula IV,
    4 to 6% of one compounds of formula V,
    16 to 18% of two compounds of formula VI, 5 to 7% of one compound of formula VII, and
15 to 17% of two compounds of formula IX.

16. An electro-optical liquid crystal display, containing a liquid crystal medium according to claims 2.

17. An electro-optical liquid crystal display, containing a liquid crystal medium according to claims 7.

18. An electro-optical liquid crystal display, containing a liquid crystal medium according to claims 12.

19. An electro-optical liquid crystal display, containing a liquid crystal medium according to claims 13.

* * * * *